United States Patent [19]

Kutsukake et al.

[11] Patent Number: 4,711,077
[45] Date of Patent: Dec. 8, 1987

[54] CUTTER HOUSING FOR POWER-DRIVEN LAWN MOWER

[75] Inventors: Mitsuhiro Kutsukake; Takahiko Murata; Gunji Saito; Takeshi Komatsuzaki; Kuniaki Uehara; Toshinobu Kato; Takeo Hattori, all of Saitama; Morimasa Hayashida, Tokyo, all of Japan

[73] Assignee: Honda Giken Kogyo Kabushiki Kaisha, Tokyo, Japan

[21] Appl. No.: 803,720

[22] Filed: Dec. 2, 1985

[30] Foreign Application Priority Data

| Nov. 30, 1984 | [JP] | Japan | 59-253175 |
| Nov. 30, 1984 | [JP] | Japan | 59-253177 |
| Nov. 30, 1984 | [JP] | Japan | 59-181816[U] |
| Dec. 1, 1984 | [JP] | Japan | 59-254499 |
| May 16, 1985 | [JP] | Japan | 60-72757[U] |
| May 17, 1985 | [JP] | Japan | 60-105318 |
| May 17, 1985 | [JP] | Japan | 60-73153[U] |
| May 17, 1985 | [JP] | Japan | 60-73160[U] |

[51] Int. Cl.$^4$ ............................................. A01D 67/00
[52] U.S. Cl. ................................ 56/320.2; 56/17.5; 56/255
[58] Field of Search ............. 56/320.2, 320.1, 255, 56/17.5, 202

[56] References Cited

U.S. PATENT DOCUMENTS

| B 494,167 | 3/1976 | Comer | 56/320.2 |
| 4,051,648 | 10/1977 | Uhlinger et al. | 56/255 |
| 4,194,345 | 3/1980 | Pioch et al. | 56/320.2 |
| 4,280,319 | 7/1981 | Scanland | 56/320.2 |
| 4,326,370 | 4/1982 | Thorud | 56/320.2 |
| 4,407,112 | 10/1983 | Shephard et al. | 56/320.2 |

FOREIGN PATENT DOCUMENTS

| 0016149 | 12/1971 | Australia | 56/320.2 |
| 0031158 | 7/1981 | European Pat. Off. | 56/320.2 |
| 2024591 | 1/1980 | United Kingdom | 56/320.1 |
| 2083733 | 3/1982 | United Kingdom | 56/320.1 |

Primary Examiner—Stephen J. Novosad
Assistant Examiner—Bruce M. Kisliuk
Attorney, Agent, or Firm—Irving M. Weiner; Joseph P. Carrier; Pamela S. Burt

[57] ABSTRACT

A cutter housing for use in a power-driven lawn mower has a substantially cylindrical skirt wall and a top wall covering the upper end of the skirt wall. The top wall has a substantially central recess for accomodating the engine of the lawn mower and includes a pair of half members positioned one on each side of the recess and lying substantially flush with each other in symmetrical and contiguous relation. The cutter housing also has a rear housing portion extending rearwardly in contiguous relation to the skirt wall and the top wall, and a partition disposed in the rear housing portion and dividing the rear housing portion into two spaces. The skirt wall, the top wall, the rear housing portion, and the partition are integrally molded of synthetic resin.

13 Claims, 17 Drawing Figures

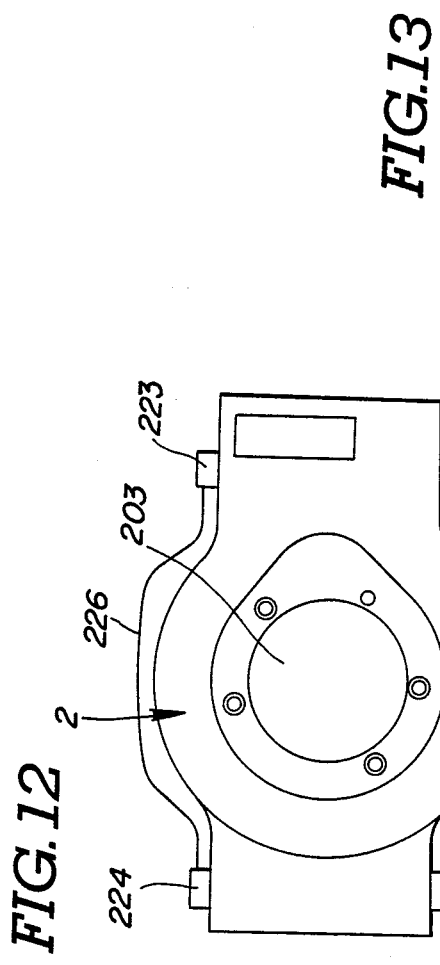
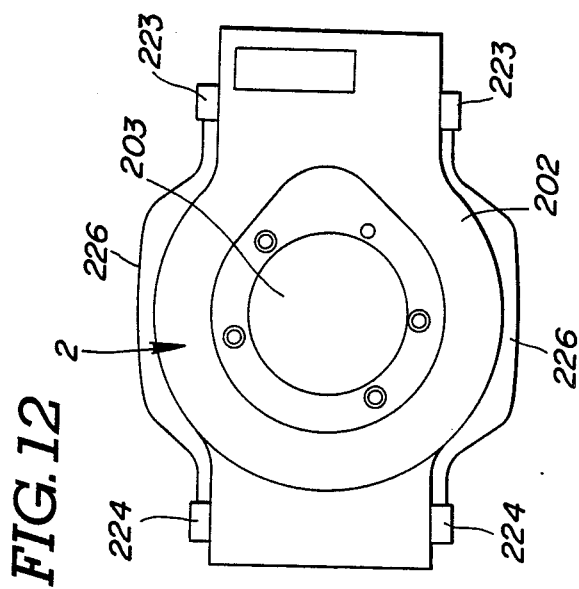
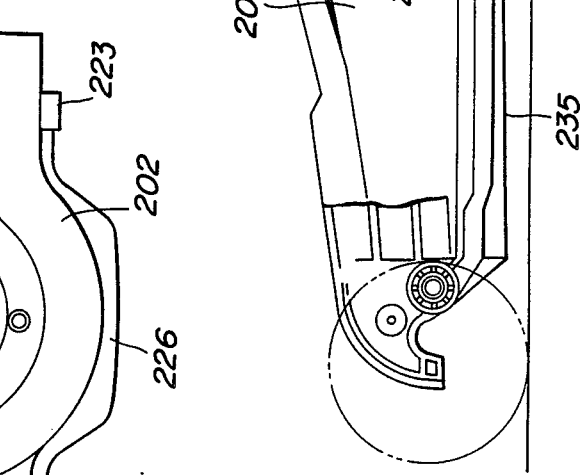

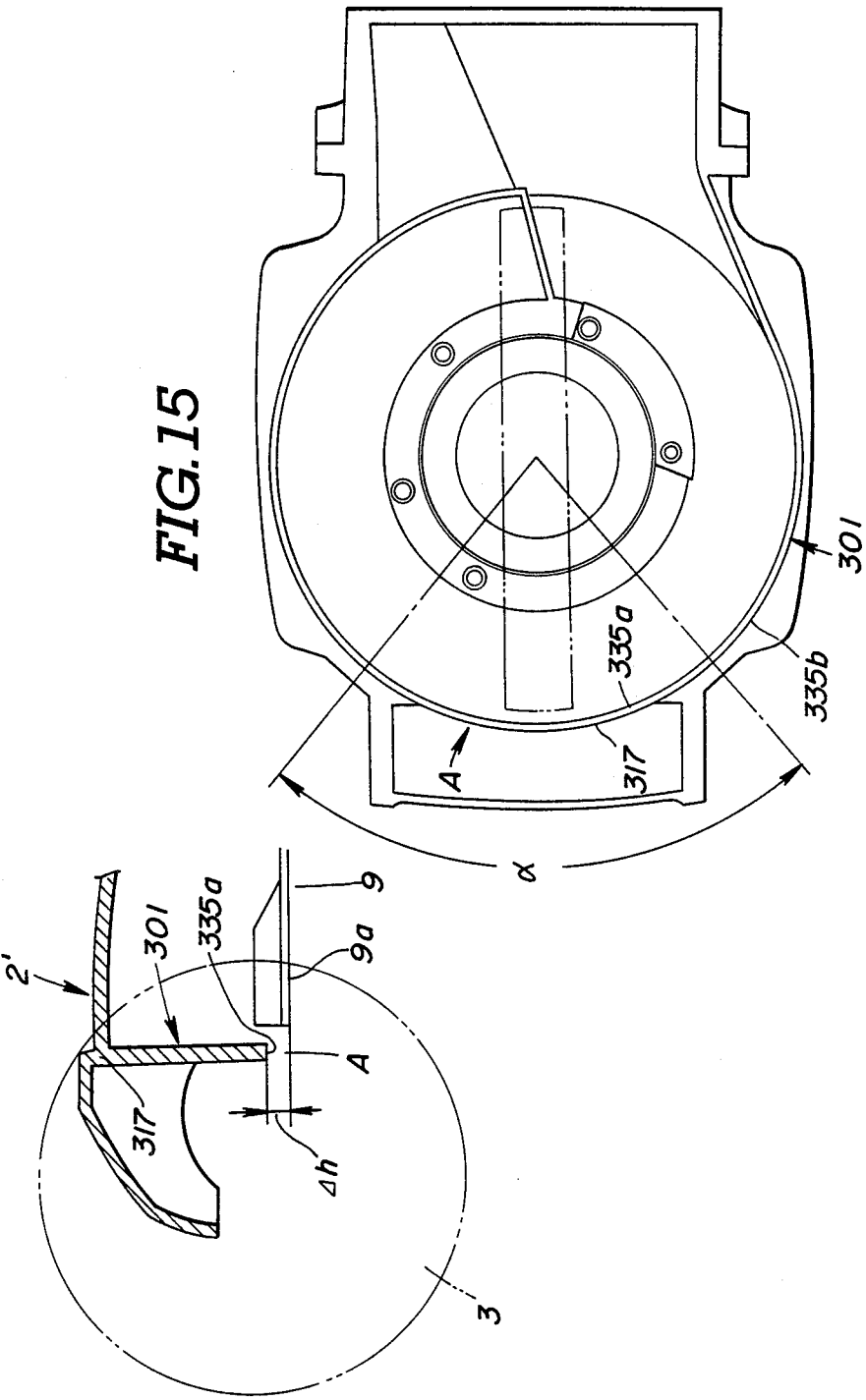

CUTTER HOUSING FOR POWER-DRIVEN LAWN MOWER

BACKGROUND OF THE INVENTION

1. Field of the Invention

The present invention relates to a cutter housing for use in a power-driven lawn mowers, and more particularly to such a cutter housing molded of synthetic resin.

2. Description of Relevant Art

Conventional cutter housings for power-driven lawn mowers are made of metal and substantially in the form of a drum opening downwardly. The cutter housing includes a top wall having one half lying substantially horizontally and the other half slanted upwardly in the rearward direction into a discharge duct for discharging grass clippings. Therefore, there is a large stepped area between the horizontal and slanted halves of the top wall. If the cutter housing were molded of synthetic resin, bending stresses would be concentrated on the stepped area, thus making the cutter housing less rigid, strong and durable.

SUMMARY OF THE INVENTION

It is an object of the present invention to provide a cutter housing for power-driven lawn mowers which is molded of synthetic resin and has sufficient rigidity, mechanical strength, and durability.

According to the present invention, there is provided a cutter housing for use in a power-driven lawn mower having an engine for driving a cutter blade, comprising a substantially cylindrical skirt wall which opens rearwardly, a top wall substantially closing the upper end of the skirt wall, the top wall having a substantially central recess for accommodating the engine therein and including a pair of half members positioned one on each side of the recess and lying substantially flush with each other in symmetrical and contiguous relation, a rear housing portion extending rearwardly from the skirt and top walls in contiguous relation, and a partition disposed in the rear housing portion and dividing the same into two spaces, the skirt wall, the top wall, the rear housing portion, and the partition being integrally molded of synthetic resin.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 12 is a plan view of the cutter housing;

FIG. 13 is an enlarged side elevational view of the cutter housing;

FIG. 14 is an enlarged fragmentary vertical cross-sectional view of a modified cutter housing, showing the positional relationship between the lower end of a front portion of a skirt wall of the modified cutter housing and a cutter blade disposed therein;

FIG. 15 is an enlarged bottom view of the modified cutter housing;

DETAILED DESCRIPTION OF THE PREFERRED EMBODIMENTS

Figure 1:
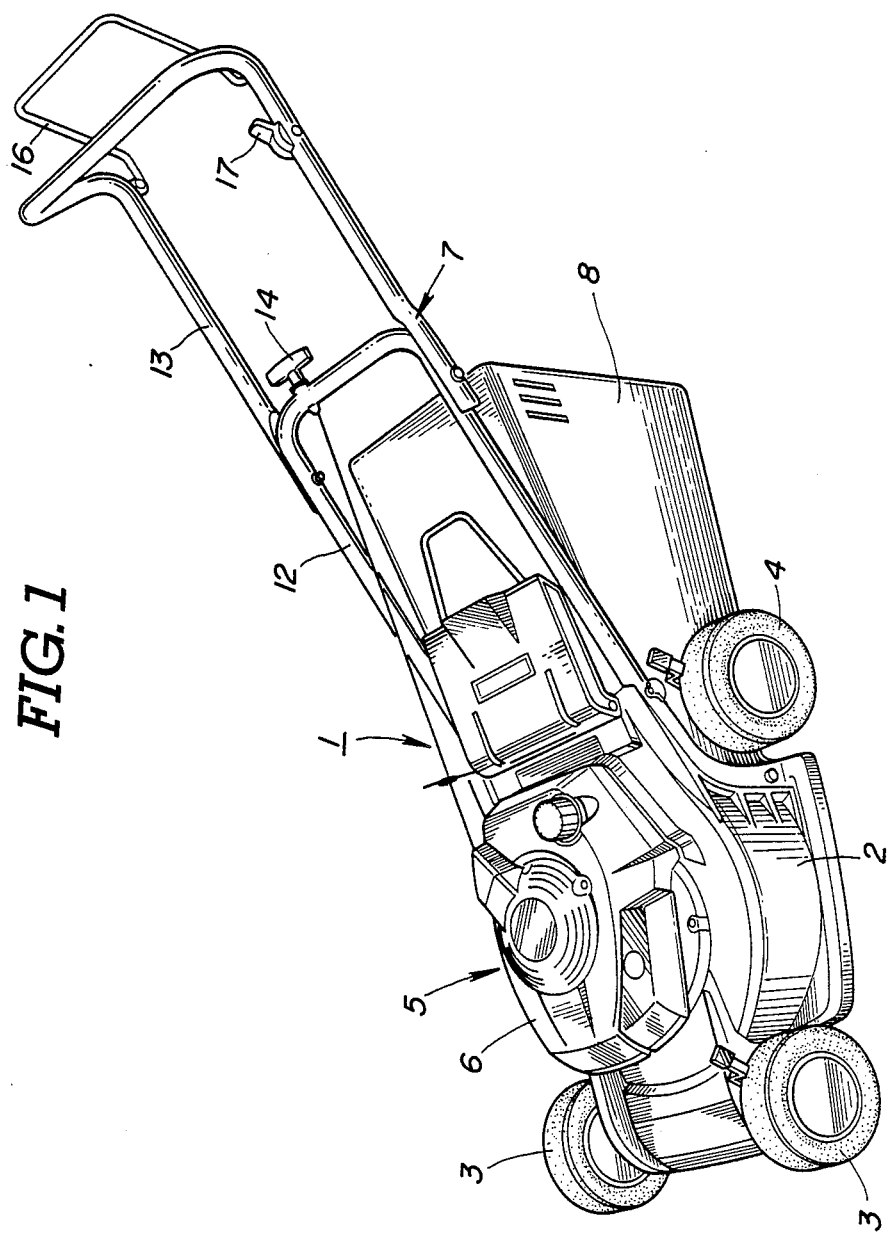
FIG. 1 a perspective view of a power-driven lawn mower having a cutter housing according to the present invention.

As shown in FIG. 1, a power-driven lawn mower 1 includes four wheels, i.e., two front wheels 3 and two rear wheels 4 disposed in surrounding relation to a cutter housing 2 molded of synthetic resin, and a vertical engine 5 mounted on the cutter housing 2 and covered with a cover 6. A handle 7 extends upwardly in the rearward direction from the lateral sides of the cutter housing 2. A grass bag 8 for containing grass clippings is attached to the rear end of the cutter housing 2 and positioned below the handle 7.

The handle 7 comprises a front handle member 12 and a rear handle member 13 which are interconnected. A recoil starter control knob 14 is attached to the front handle member 12, and a brake lever 16 and a control lever 17 are attached to the rear handle member 13.

Figure 2:
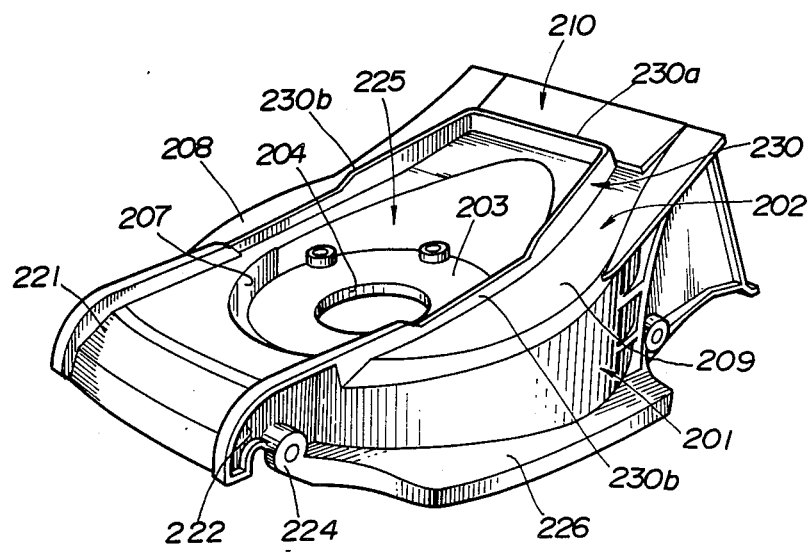
FIG. 2 is a perspective view of the cutter housing.
Figure 3:
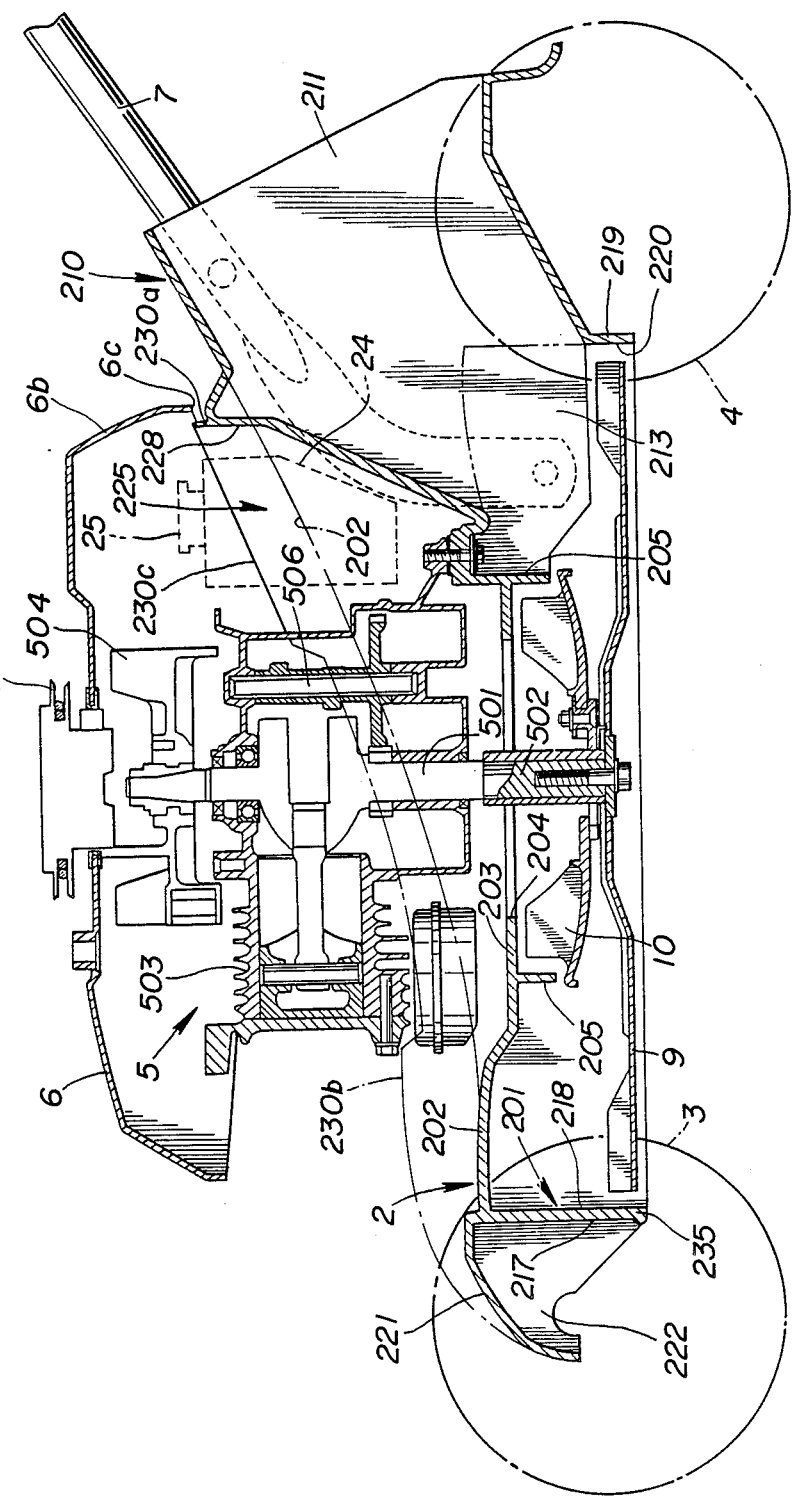
FIG. 3 an enlarged vertical cross-sectional view of a major portion, including the cutter housing, of the power-driven lawn mower.

As illustrated in FIGS. 2 and 3, the cutter housing 2 is of a substantially cylindrical shape opening downwardly and having a peripheral skirt wall 201 and a top wall 202 covering the upper end of the peripheral skirt wall 201. The top wall 202 has a central circular opening 204 through which there extends downwardly the output portion 502 of a vertical crankshaft 501 of the vertical engine 5 disposed on the top wall 202. A cutter blade 9 and a discharge fan 10 located above the cutter blade 9 in substantially superimposed relation are fixed to the lower end of the output portion 502. The discharge fan 10 is surrounded by an inner cylindrical wall 205 integral with the housing top wall 202. The engine 5 includes a horizontal cylinder 503 across which the vertical crankshaft 501 extends with a cooling fan 504 fixed to the upper end thereof. A recoil starter pulley 11 is mounted centrally on the cover 6 in coaxial relation to the crankshaft 501.

In operation, the cutter blade 9 is rotated in a horizontal plane by the output portion 502 of the crankshaft 501. At the same time, the discharge fan 10 is also rotated by the output portion 502 to generate an air flow for discharging grass clippings cut off by the cutter blade 9. More specifically, the discharge fan 10 draws air through the opening 204 and the inner cylindrical wall 205 into the cutter housing 2 to produce an air flow by which the grass clippings can be delivered into a discharge duct 212 (described herein below and shown in FIG. 4) communicating with the grass bag 8. The engine 5 includes a shaft 506 which is rotatable by the crankshaft 501 to drive the rear wheels 4.

Figure 4:
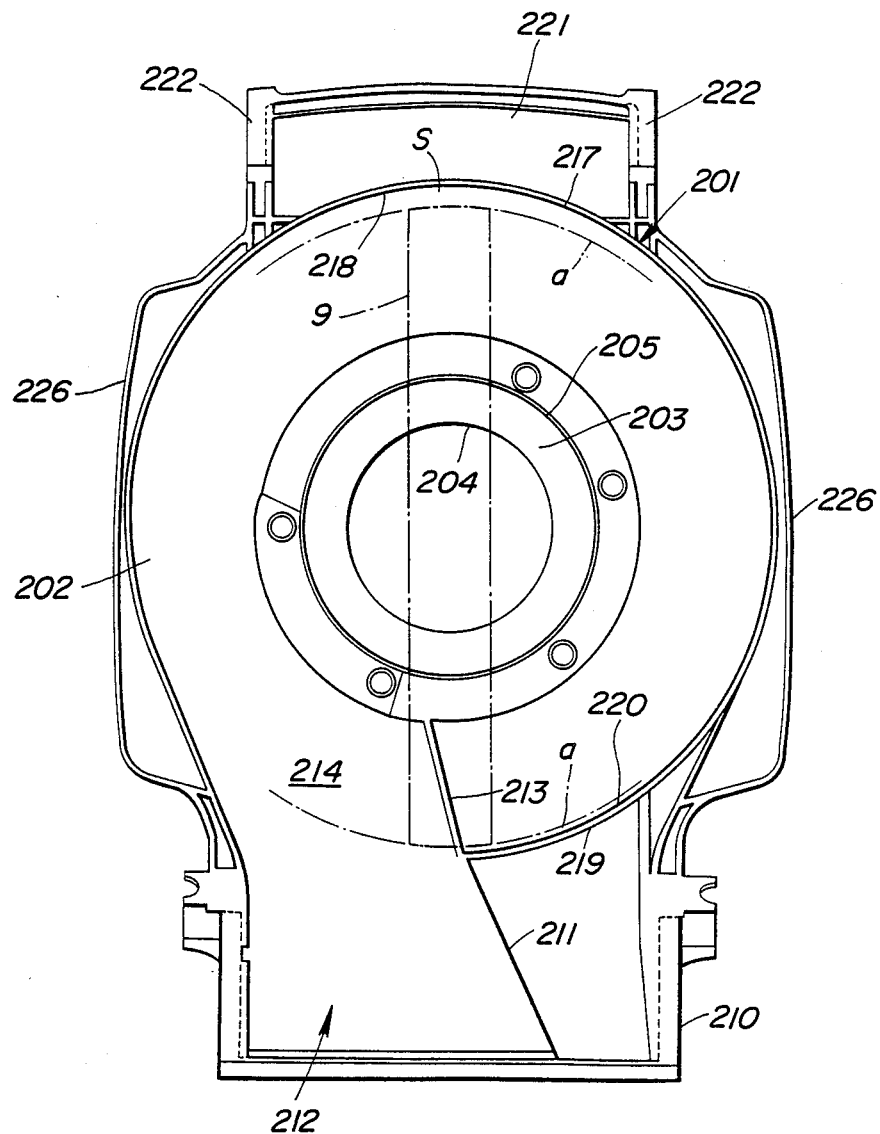
FIG. 4 is an enlarged bottom view of the cutter housing.

The top wall 202 has a central recess 225 in which the engine 5 is partly received. The central recess 225 has a bottom 203 in which the opening 204 is defined and which is surrounded by a slanted wall 207 flaring upwardly. The top wall 202 includes a pair of substantially symmetrical lateral surfaces or half members 208, 209 inclined upwardly in the rearward direction and contiguous to the upper edge of the slanted wall 207, the lateral surfaces 208, 209 lying flush with each other and extending rearwardly into a highest rear portion 210 of the cutter housing 2. As shown in FIG. 4, the peripheral skirt wall 201 of the cutter housing 2 opens rearwardly. A partition 211 is vertically disposed behind the recess 225 or in the rear portion 210 in a substantially intermediate position in the transverse direction to divide the rear portion 210 into two chambers or spaces, one serving as the discharge duct 212. The partition 211 extends obliquely to the longitudinal axis of the housing 2 and includes a portion 213 defining on one side thereof a duct guide 214 within the space surrounded by the skirt wall 201. The duct guide 214 communicates with the discharge duct 212. The cutter blade 9 is rotated counterclockwise (FIG. 4) to cut off grass clippings, which are delivered by the discharge fan 10 via the duct guide 214 and the duct 212 into the grass bag 8.

The inclined surfaces 208, 209 of the top wall 202 extend upwardly in the rearward direction in transversely symmetrical relation and lie flush with each other at their front and rear portions. The inclined surfaces 208, 209 are therefore substantially free of mechanically weak portions such as steps or bent portions. Even if the cutter housing is molded of synthetic resin, therefore, it is sufficiently strong. The cutter housing is also of a functionally sufficient structure as the partition 211 defines the discharge duct 212 and the scroll-shaped duct guide 214.

Figure 5:
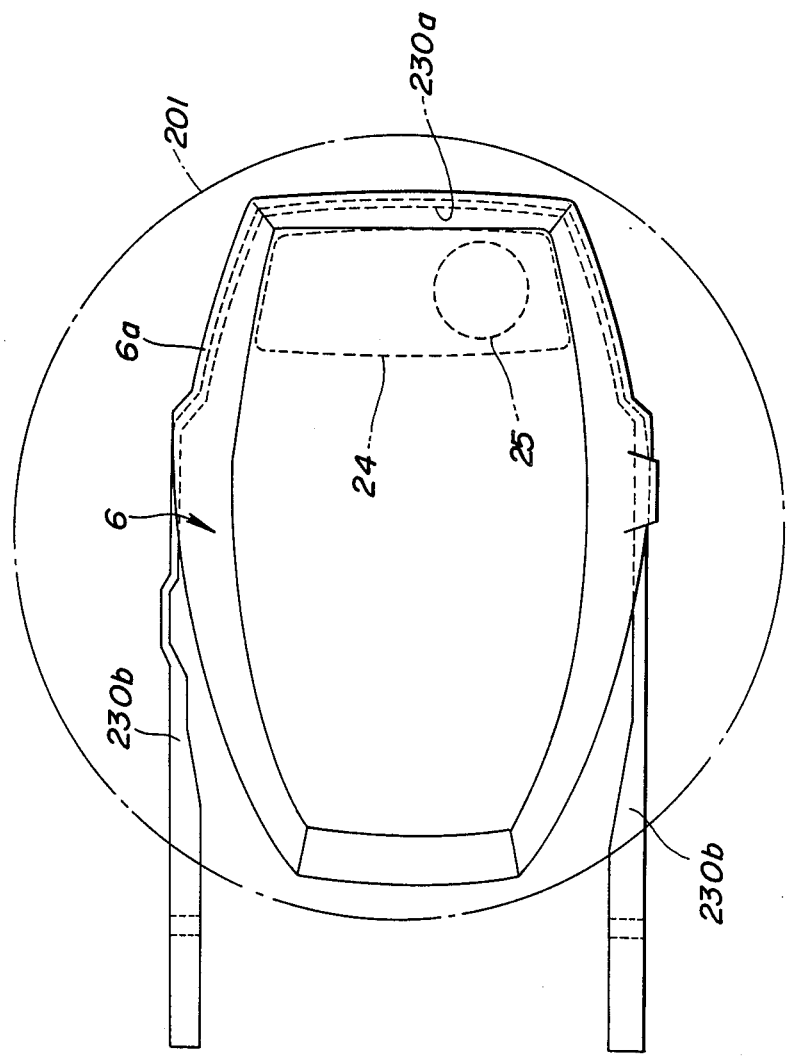
FIG. 5 is an enlarged plan view showing the positional relationship between a continuous ridge on the top wall of the cutter housing and the periphery of an engine cover.

A ridge 230 doubling as a rib is disposed on the top wall 202 of the cutter housing 2 in surrounding relation to the recess 225. The ridge 230 has a rear member 230a extending transversely on the rear portion 210 of the cutter housing 2 and a pair of side members 230b extending forwardly from the opposite ends of the rear member 230a on the opposite sides of the recess 225. The rear member 230a and the rear portions of the side members 230b are positioned within the outer profile 6a of the engine cover 6, as shown in FIG. 5, and have their upper edge 230c lying at substantially the same level as or slightly higher than that of the lower edge 6c of a downward portion 6b of the engine cover 6. Consequently, the recess 225 of the cutter housing 2 is covered at its upper and lateral sides by the engine cover 6.

Rain water on the outer surface of the engine cover 6 flows down the outer walls thereof onto the top wall 202 on the opposite sides of the cutter housing 2, and then is discharged out along the top wall 202 without entering the recess 225.

The ridge 230 extending around the recess 225 serves to reinforce the cutter housing 2. As shown in FIGS. 3 and 5, a fuel tank 24 having a fuel supply port 25 is disposed adjacent to the engine 5 and covered with the engine cover 6.

Figure 6:
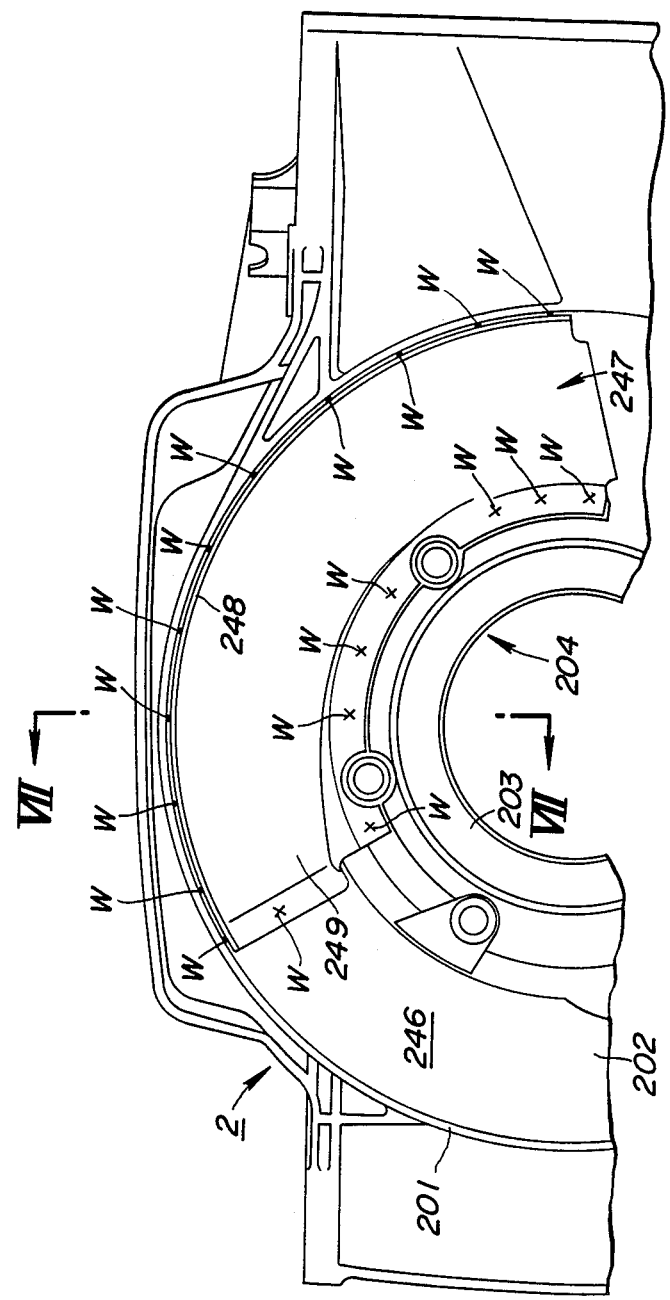
FIG. 6 is an enlarged bottom view of a half of the cutter housing, illustrating a ceiling plate attached to the underside of the top wall.
Figure 7:
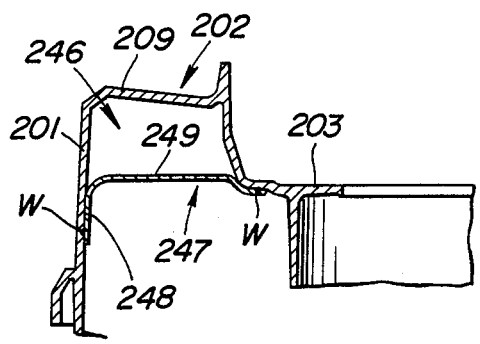
FIG. 7 is a cross-sectional view taken along line VII—VII of FIG. 6.

As shown in FIGS. 6 and 7, an intermediate ceiling panel 247 is disposed in one-half of the side of the cutter housing 2 in which the discharge duct 212 is not located, i.e., in an upper half 246 shown in FIG. 6. The intermediate ceiling panel 247 is molded of synthetic resin and substantially arcuate when viewed in plan. The intermeidate ceiling panel 247 includes a downward flange 248 extending along an outer peripheral edge thereof, and has a slanted surface 249 inclined downwardly in the rearward direction.

The slanted surface 249 has its front portion held against the lower surface of the front portion of the inclined surface 209 of the top wall 202 within the half 246 of the cutter housing 2. The front portion of the slanted surface 249 is ultrasonically spot-welded at w to the inclined surface 209. The inner side of the rear portion of the slanted surface 249 is held against the lower surface of the bottom 203 of the recess 225, and the downward flange 248 of the intermediate ceiling panel 247 is ultrasonically spot-welded at w to the housing skirt wall 201. The inner peripheral edge of the slanted surface 247 is also ultrasonically spot-welded at w to the peripheral edge of the bottom 203 of the housing recess 225.

Figure 8:
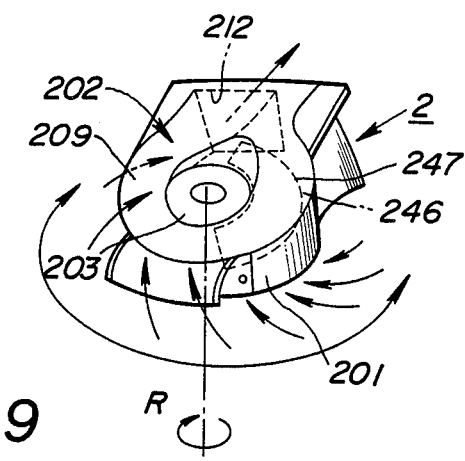
FIG. 8 is a perspective view showing the manner in which the ceiling plate attached to the underside of the top wall functions.

The intermediate ceiling panel 247 thus disposed in the half 246 of the cutter housing 2 is contiguous to the front portion of the top wall 202 and slanted downwardly in the rearward direction. The volume of the space within the housing half 246 is therefore substantially reduced with the substantial ceiling surface of the cutter housing 2 being of a progressively raised configuration. Although the top wall 202 of the cutter housing 2 is transversely symmetrical in its appearance, it has an asymmetrical ceiling surface (FIG. 8) for effectively introducing air into the cutter housing 2 to collect grass clippings efficiently in the grass bag 8, and thereby neatly finishing the mowed lawn.

Since the intermediate ceiling panel 247 provides a double-walled construction for the ceiling of the housing half 246, the cutter housing 2 of synthetic resin is increased in mechanical strength. The intermediate ceiling panel 247 of synthetic resin is welded to the housing top wall 202 to provide a unitary housing structure which is of better commercial advantage.

Figure 9:
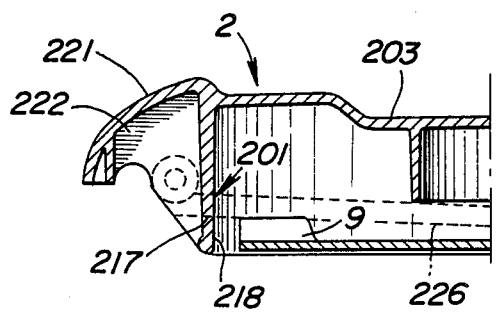
FIG. 9 is a fragmentary vertical cross-sectional view of a front portion of the cutter housing.

The skirt wall 201 of the cutter housing 2 has a front portion 217 projecting forwardly (FIG. 4) to provide a larger clearance S between an inner wall 218 of the front portion 217 and the circular path a of movement of the tip ends of the cutter blade 9 than the clearance between other portions, e.g., an inner wall 220 of a rear portion 219 and the circular path. As shown in FIGS. 3 and 9, a tongue 221 extends forwardly and downwardly from the upper edge of the front portion 217 of the skirt wall 201. The tongue 221 is contiguous at its opposite sides to side members 222 (FIG. 4) projecting forwardly from the lateral sides of the front portion 217. The tongue 221 and the side members 222 are integrally molded with the skirt wall 201 to provide a ribbed front housing portion reinforcing the front portion 217.

Figure 10:
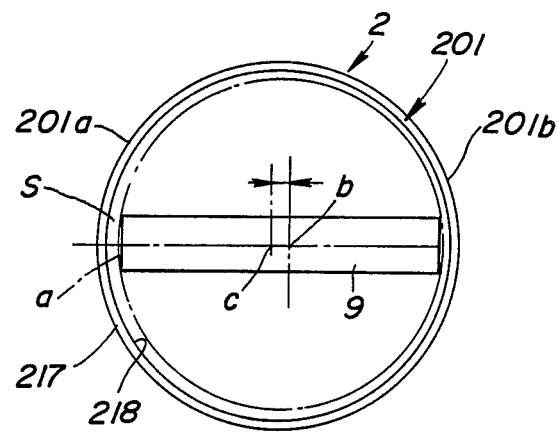
FIG. 10 is a bottom view of a skirt wall of the cutter housing, showing the relationship between the skirt wall and the path of movement of the tip ends of a cutter blade.

As shown in FIG. 10, the skirt wall 201 comprises a front semicircular portion 201a and a rear semicircular portion 201b which have respective centers b, c spaced or offset from each other to cause the front portion 217 to project forwardly, thus providing the larger clearance S. Since the front housing portion 217 is reinforced with the ribs, it is highly rigid for protection against deformation or damage which would arise from impinging upon an obstacle while mowing the lawn. Even if the front housing portion 217 is deformed, its inner wall 218 will not interfere with the tip ends of the cutter blade 9 because of the large clearance S present therebetween, so that smooth mowing operation is assured.

Figure 11:
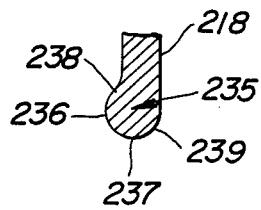
FIG. 11 is an enlarged fragmentary vertical cross-sectional view of the lower end of the skirt wall.

As illustrated in FIG. 11, the skirt wall 201 has a lower end 235 formed as a beaded edge 236 having a curved lower surface 237 and projecting outwardly as a round edge 238. The beaded edge 236 also has an inner peripheral surface 239 lying flush with or radially outwardly of the vertical inner surface 218 of the skirt wall 201 to maintain the clearance S between the inner surface 218 and the tip ends of the cutter blade 9. The beaded edge 235 extends fully along the lower end of the skirt wall 201. The curved lower surface 237 of the beaded edge 236 presents small resistance to the movement of the skirt wall 201 with respect to the lawn, and hence the lawn mower can be moved smoothly during operation. Even if the skirt wall 201 hits an obstruction such as a stone on the lawn, the skirt wall 201 is prevented from being cracked or otherwise damaged since the beaded edge 236 provides increased mechanical strength and rigidity, which is given by the beaded edge 236 without increasing the thickness of the entire skirt wall 201.

As shown in FIGS. 2 and 12, the side members 222 of the cutter housing 2 have respective bosses 224 by which the shafts of the front wheels 3 are rotatably supported. The cutter housing 2 also has bosses 223 on its rear portion, by which the shafts of the rear wheels 4 are rotatably supported. The skirt wall 201 also has a pair of radially outward integral flanges 226 on the respective lateral sides thereof, the flanges 226 being integrally contiguous to the bosses 224, 223.

As shown in FIG. 13, each of the flanges 226 is slanted slightly upwardly in the forward direction with respect to the lower end 235 of the skirt 201, which lies slightly downwardly of the plane in which the cutter blade 9 rotates. The flanges 226 have front portions positioned upwardly of the plane in which the cutter blade 9 rotates, as shown in FIG. 9.

While the lawn mower 1 is in operation, the lower end 235 of the skirt wall 201 is inclined slightly downwardly in the forward direction with respect to the ground G, and the flanges 226 are kept substantially parallel to the ground G, as shown in FIG. 13. Since the clearance between the front portions of the flanges 226 and the ground G is relatively large, the grass is less liable to engage the front portions of the flanges 226. Therefore, where the lawn mower is manually pushed by the user, it can be pushed easily without encountering substantial resistance from the grass. The housing 2, particularly, its skirt wall 201, is rendered sufficiently rigid by the flanges 226 along its lower end.

As shown in FIG. 3, the lower end 235 of the skirt wall 210 is positioned downwardly of the lower surface of the cutter blade 9 to surround the cutter blade 9 fully circumferentially therearound at the same height from the ground. In other words, blade 9 is located slightly above the lower end 235 of the skirt wall 201. When the lawn mower 1 is moved to the left (FIG. 1) to cut the grass, the grass first hits the lower end 235 of the skirt wall 201 at its front portion 217, is bent thereby, and then enters the housing 2 where it is hit and cut by the cutter blade 9. There is, therefore, some resistance to the movement of the lawn mower 1 during operation, and the height of the grass cut and left on the ground, i.e., the cutting height, is comparatively large. As the cutter blade 9 is fully circumferentially surrounded by the skirt wall 201, obstacles such as stones are first engaged by the skirt wall 201, and hence the cutter blade 9 is protected against direct contact with the obstacles.

In some countries in which lawn mowers are used, it is required to cut off grass to greater lengths or leave shorter grass stem. Accordingly, in a modified embodiment of the present invention the lower end of the front portion of the cutter housing would be made higher than the cutter blade.

FIGS. 14 and 15 illustrate a cutter housing structure designed to meet such a requirement. The cutter housing, generally denoted at 2', has a skirt wall 301 having a lower end 335b positioned downwardly of the lower surface 9a of the cutter blade 9, except for a front portion 317 of the skirt wall 301. The front portion 317 has a lower end 335a recessed so as to be higher than the lower surface 9a of the cutter blade 9 by a distance h (FIG. 14). As shown in FIG. 15, the recessed portion, denoted at A, of the lower end 335a extends angularly for an angle $\alpha$ which is determined in an angular range to get the rate of cutting the grass by the cutter blade 9 compatible with the rate of discharging the grass clippings by the discharge fan 10 at the time the lawn mower 1 is moved.

With this arrangement, the front portion 317 of the skirt wall 301 is recessed to expose the cutter blade 9, so that the grass is cut off readily by the cutter blade 9 without being bent or obstructed by the front portion 317. As a consequence, the grass can be cut off to larger lengths or the grass stems left on the ground are short, and the lawn mower 1 is subject to less resistance while in operation.

Figure 16:
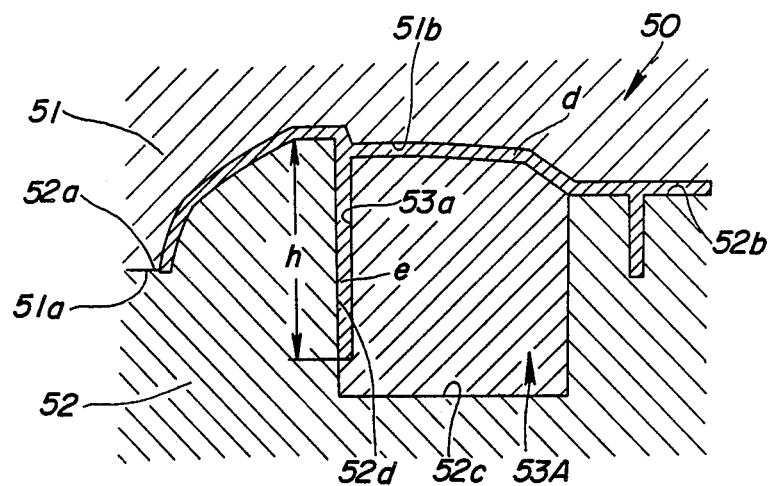
FIG. 16 is a fragmentary cross-sectional view of a mold assembly for molding the cutter housing shown in FIGS. 1 through 13.

The other details of the cutter housing 2' are the same as those of the cutter housing 2 shown in FIGS. 1 through 13. The cutter housing 2, 2' is molded in the following manner:

As shown in FIG. 16, a mold assembly 50 comprises an upper mold 51 and a lower mold 52 which have mating surfaces 51a, 52a, respectively, including shaping surfaces 51b, 52b, respectively. The shaping surfaces jointly define a mold cavity d for molding the top wall 202 of the cutter housing 2. The lower mold 52 has a substantially circular slot (not shown) for molding the skirt wall and a recess 52c extending through a predetermined angle. An intermediate mold 53A is fitted in the recess 52c and has a recessed or stepped surface 53a defined in its front face and extending through the predetermined angle, the stepped surface 53a having the same vertical dimension as that of the circular slot in the lower mold 52. The stepped surface 52a and a confronting front wall 52d of the recess 52c jointly define a cavity e communicating with the cavity d for molding the front portion of the skirt wall. A cutter housing molded in the mold assembly 50 has a skirt wall having a uniform height h for surrounding the cutter blade.

Figure 17:
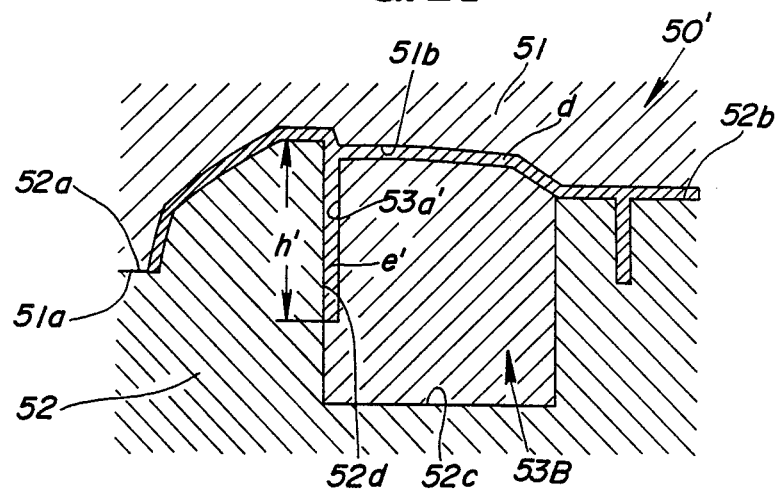
FIG. 17 is a fragmentary cross-sectional view of another mold assembly for molding the cutter housing shown in FIGS. 14 and 15.

FIG. 17 shows another mold assembly 50' which differs from the mold assembly 50 in that an intermediate mold 53B is fitted in place of the intermediate mold 53A. The intermediate mold 53B has a recessed or stepped surface 53a' vertically shorter than the stepped surfce 53a (FIG. 16) to define a cavity e' communicating with the cavity d for molding the skirt wall front portion. Since the cavity e' is vertically shorter than the cavity e, the front portion of a skirt wall of a cutter housing molded by the mold assembly 50' is of a shorter vertical dimension h'.

Therefore, longer and shorter skirt wall front portions can be molded in the mold assemblies 50, 50' by replacing the intermediate molds 53A, 53B in the lower mold 52.

The mold assemblies 50, 50' which can mold the cutter housings 2, 2', respectively, as shown in FIGS. 3 and 14 share the upper and lower molds 51, 52. These cutter housings 2, 2' with longer and shorter skirt wall front portions 217, 317 can be molded simply by changing the intermediate molds 53A, 53B in the lower mold 52. It is therefore not necessary to prepare two separate mold assemblies for molding the cutter housings 2, 2'. As a consequence, the cost of production of the different cutter housings is reduced, and hence different lawn mowers structured for use in different countries can be manufactured relatively inexpensively.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A cutter housing for use in a power-driven lawn mower having an engine for driving a cutter blade, comprising:
   a substantially cylindrical skirt wall which opens rearwardly;
   a top wall substantially closing the upper end of said skirt wall;
   said top wall having a substantially central recess for accommodating the engine therein and including a pair of half members positioned one on each side of said recess and lying substantially flush with each other in symmetrical and contiguous relation;
   a rear housing portion extending rearwardly from said skirt and top walls in contiguous relation;
   a partition disposed in said rear housing portion and dividing the same into two spaces; and
   said skirt wall, said top wall, said rear housing portion, and said partition being integrally molded of synthetic resin.

2. A cutter housing according to claim 1, wherein:
   said top wall is inclined upwardly in the rearward direction;
   one of said spaces in said rear housing portion defines a discharge duct for discharging grass clippings; and
   said cutter housing further includes an intermediate ceiling panel of synthetic resin attached to the underside of one of said half members which is positioned remotely from said discharge duct, said intermediate ceiling panel being inclined downwardly in the rearward direction.

3. A cutter housing according to claim 2, wherein said intermediate ceiling panel has a front portion joined to the underside of said one of the half members and a rear portion having an inner side thereof joined to a lower surface of the bottom of said recess of the top wall.

4. A cutter housing according to claim 1, further including an engine cover disposed in covering relation to said engine, said top wall having a ridge disposed on an upper surface thereof and extending around said recess, said ridge having a rear portion positioned within the outer profile of said engine cover.

5. A cutter housing according to claim 4, wherein said rear portion of said ridge has an upper edge lying at substantially the same level as or slightly higher than that of the lower edge of said engine cover.

6. A cutter housing according to claim 1, further including front and rear wheels, and a front housing portion projecting forwardly from a front portion of said skirt wall and having first bosses by which said front wheels are rotatably supported, said rear housing portion having second bosses by which said rear wheels are rotatably supported, and aid skirt wall having flanges disposed respectively on lateral sides thereof and projecting outwardly in integral relation to said first and second bosses.

7. A cutter housing according to claim 1, wherein said skirt wall has flanges disposed respectively on lateral sides thereof and slanted upwardly in the forward direction with respect to the lower end of said skirt wall.

8. A cutter housing according to claim 1, wherein said skirt wall has a front portion projecting forwardly to provide a greater clearance between the inner surface of said front portion of the skirt wall and the tip ends of said cutter blade than the clearance between other inner surface portions said skirt wall and said tip ends of the cutter blade.

9. A cutter housing according to claim 8, including a front housing portion projecting forwardly from said front portion of the skirt wall in contiguous relation to reinforce said front portion of the skirt wall.

10. A cutter housing according to claim 1, wherein said skirt wall has a lower end formed as a beaded edge.

11. A cutter housing molded of synthetic resin for use in a power-driven lawn mower having an engine for driving a cutter blade, comprising:
   a substantially cylindrical skirt wall adapted to surround the cutter blade; and
   a pair of reinforcing flanges integral with and projecting outwardly from opposite lateral sides of said skirt wall, said flanges being slanted upwardly in a forward direction with respect to the lower end of said skirt wall.

12. A cutter housing molded of synthetic resin for use in a power-driven lawn mower having an engine for driving a cutter blade, comprising:
   a substantially cylindrical skirt wall adapted to surround the cutter blade;
   said skirt wall having a first front portion projecting forwardly to provide a greater clearance between the inner surface of said first front portion of the skirt wall and the tip ends of said cutter blade than the clearance between other inner surface portions of said skirt wall and said tip ends of the cutter blade; and
   said skirt wall having a second front portion recessed upwardly such that a lower surface thereof is positioned higher than a lower surface of said cutter blade.

13. A cutter housing according to claim 12, including a front housing portion projecting forwardly from said front portion of the skirt wall in contiguous relation to reinforce said front portion of the skirt wall.

* * * * *

UNITED STATES PATENT AND TRADEMARK OFFICE
CERTIFICATE OF CORRECTION

PATENT NO. : 4,711,077
DATED : December 8, 1987
INVENTOR(S) : Kutsukake et al.

It is certified that error appears in the above-identified patent and that said Letters Patent is hereby corrected as shown below:

```
Column 1, line 8, after "use in" delete "a".
Column 4, line 54, after "path" insert --a--.
Column 6, line 9, change "stem" to --stems--;
         line 65, change "surfce" to --surface--.
Column 8, line 15 (claim 6, line 7), change "aid"
to --said--;
         line 29 (claim 8, line 6), after
"portions" insert --of--.
In the Abstract, line 4, change "accomodating"
to --accommodating--.
```

Signed and Sealed this

Twenty-fourth Day of May, 1988

*Attest:*

DONALD J. QUIGG

*Attesting Officer*  *Commissioner of Patents and Trademarks*